Feb. 24, 1970   W. NYC   3,496,986
TIRE SAFETY DEVICE
Filed July 12, 1967   2 Sheets-Sheet 1

INVENTOR.
Wladimir Nyc

Feb. 24, 1970 W. NYC 3,496,986
TIRE SAFETY DEVICE

Filed July 12, 1967 2 Sheets-Sheet 2

INVENTOR.
Wladimir Nyc

United States Patent Office 3,496,986
Patented Feb. 24, 1970

3,496,986
TIRE SAFETY DEVICE
Wladimir Nyc, Sacramento, Calif.
(4411 San Jose Blvd., Jacksonville, Fla. 32207)
Filed July 12, 1967, Ser. No. 652,958
Int. Cl. B60c 23/00, 23/04, 23/16
U.S. Cl. 152—418                                           5 Claims

ABSTRACT OF THE DISCLOSURE

A high pressure air reservoir on a vehicle wheel communicates through valve members with the tire inflating chamber to maintain a predetermined pressure therein. Mechanism is also provided to give warning of low tire pressure.

---

This invention relates to a safety device for tires and more particularly to a means of providing a constant pressure within the tire irregardless of the temperature and speed with which the car is moving.

It is an object of the present invention to provide a tire pressurizing device which is simple, efficient, and one that can be readily adapted to commercially produced tires.

Another object of the present invention is to provide a warning to the driver of the vehicle when the pressure cannot be maintained constant within the tire, as would occur, for example, when the tire receives a large puncture, thus allowing the driver to stop safely.

Still a further object of the present invention is to provide a tire safety device which can be produced, installed and sold in large quantities at a comparatively low cost and which if installed in a large number of automobiles will considerably decrease the number of accidents caused by: puncture of tire, rupture due to excess pressure or heat, and those resulting from a difference of pressures in the tires of the vehicle.

Still additional objects, benefits, and advantages of this invention will become evident from a study of the following detailed description taken in conjunction with the accompanying drawing, in which.

Figure 1:
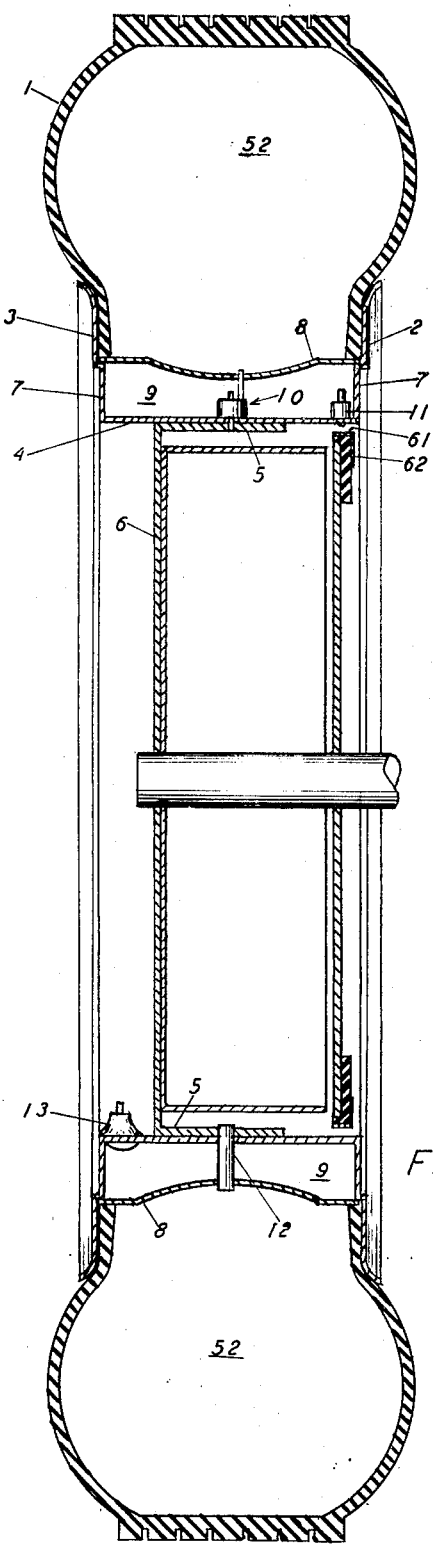
FIGURE 1 is a diametrical cross sectional view of a vehicle wheel and tire.

Referring now specifically to the drawing, a cross sectional view of a vehicle wheel is shown in FIGURE 1, the wheel carrying a conventional tubeless tire 1 mounted between the inner wheel flange 2 and outer wheel flange 3 and including an inner rim secured to the flange 5 of a drum 6.

In accordance with the present invention, a rim plate 8 or tire mounting plate, is added between the inner rim 4, of the wheel and the tire 1. The rim plate 8 is continuous, as is the inner rim 4, thus forming with a pair of boundary walls 7 a compartment 9, which contains air under high pressure received through the customary valve 13, associated with the compartment 9 is a pressure balancing mechanism 10, a low pressure signaling mechanism 11, a high pressure escape valve 12, and a conventional air inlet valve 13. The details of various of these devices will now be described.

Figure 2:
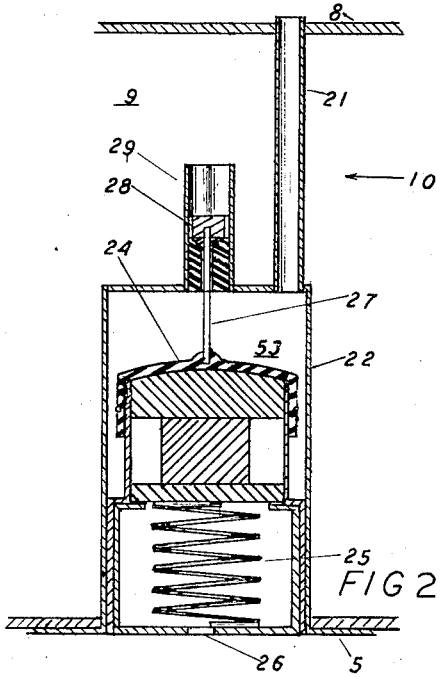
FIGURE 2 is a fragmentary sectional view to an enlarged scale of the pressure balancing mechanism.
Figure 3:
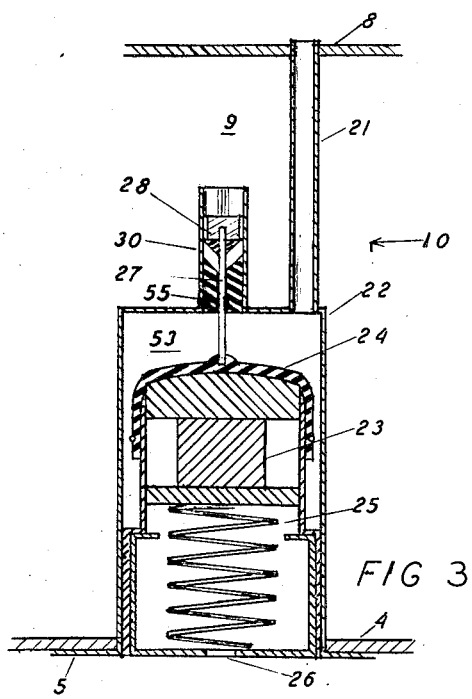
FIGURE 3 is a view similar to FIGURE 2, but with the parts in a different position.

The pressure balancing mechanism 10 appears most clearly in FIGURES 2 and 3, and comprises connecting tube 21, affixed to the rim plate 8 at one end and at the other end to a large piston housing 22 mounted on the rim 4. Within the large piston housing 22 is a large piston 23, a large piston cover 24 which is curved to give maximum surface area and which overlaps to the sides of the large piston, a pressure balancing mechanism spring 25, and an adjustment screw 26, with which to adjust the tension of the spring 25.

Upstanding from the large piston 23, is a connecting rod 27 secured to a small elastomeric, inverted conical piston 28 within a small piston housing 29 open at its upper end. The piston 28 seats against a conical seat, and when unseated exposes an opening 30 in the housing (see FIGURE 3).

The low pressure signaling mechanism 11 consists of a signalling mechanism piston 31. The piston 31 moves within a housing 33, and is urged upward by a compression spring 34. A piston rod 35 is attached to the piston 31 at one end and at the other end is pivotally mounted on a lever 36 rockably pivoted on a pivot block 37, pivotally mounted on the nether end of the lever 36 is a vertically translatable contact area 38.

Figure 4:
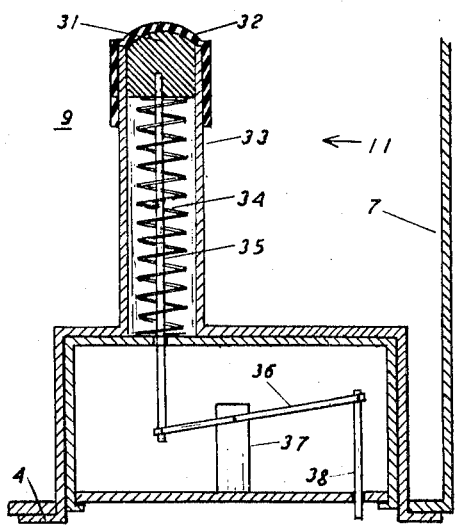
FIGURE 4 is a fragmentary sectional view to an enlarged scale of the low pressure signaling mechanism.

The high pressure escape valve 12, FIGURE 4, consists of a tubular casing 41 having transversely mounted therein an annulus 42 guiding a vertical rod 43 upstanding from a metal cap 44 covering an elastomeric inverted conical valve 46 seated in a conical elastomeric seat 47 formed in an insert 48 having a central bore 49. A compression spring 51 biases the valve 46 downwardly into seated positions.

The operation of the pressure balancing mecanism will now be readily understood by refering to FIGURES 2 and 3. The high pressure reservoir 9 contains air pressure considerably in excess to the air pressure within the tire chamber 52. The tire pressure is transmitted through the tube 21 and into the chamber 53 exerting a downward force on the piston cover 24. When the air pressure in the tire chamber 52 is at its specified value, the sum of the forces that result from the relatively small air pressure within the tire acting on the large surface area of the covering 24 of the large piston 23, and the high air pressure of the high pressure reservoir 9, acting through the opening 30 on the small surface area of the small piston 28 is equal to the calibrated tension of the compression spring 25; and consequently there is no transfer of air from the high pressure reservoir 9 to the tire chamber 52.

When the air pressure in the tire chamber 52 decreases however the air pressure in the chamber 53 also decreases thus reducing the downward force acting on the spring 25 the result being that the spring 25 expands, as in FIGURE 3, thus raising the small piston 28 to which it is connected by the connecting rod 27. As the small piston 28 lifts, air from the high pressure reservoir passes inwardly through the port 30, thence downwardly alongside the connecting rod 27 which is loosely fitted in the valve seat insert 55. Air emerging from the bottom of the insert passes into the chamber 53, thence through the tube to the tire chamber 52. When the tire pressure is once again established at normal (specified value) the sum of the forces acting on the two pistons compresses the spring 25 and thus closes the small piston valve 28.

If, for example, the pressure in the tire chamber 52 is thirty pounds per square inch, with the surface area of large piston 23 being one square inch; and the pressure in the high pressure reservoir 9 is one hundred pounds per square inch, with the small piston surface area of .01 square inch, then, since pressure $$P = \frac{F}{A} = \frac{\text{force}}{\text{area}}$$

the force acting on large piston equals thirty pounds per square inch times one square inch equals 30 pounds. The force acting on the small piston equals one hundred pounds per square inch times .01 square inch equals one pound.

The force acting on the spring when it is in "compressed" form would be thirty-one pounds and the spring should be calibrated to have a stored force of approximately 31 pounds when in this state. If the pressure in the tire dropped, for example to twenty-five pounds per square inch, then the force acting on the spring 25 would be $$25 \times 1 = 25 \text{ lb.}$$
$$100 \times .01 = 1 \text{ lb.}$$
$$\text{Sum} = 26 \text{ lb.}$$

and the spring would have a force of five pounds acting on the piston valve 28 and air would enter into the tire chamber 52. The effect on the apparatus by the loss of this quantity of air from the high pressure chamber 9, would be negligible.

Figure 5:
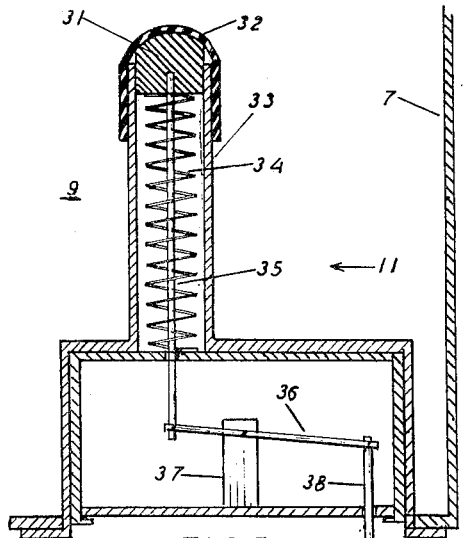
FIGURE 5 is a view similar to FIGURE 4 but with parts in a different position.

Should the air pressure in the tire be reduced to a level where it cannot be effectively restored by the pressure balancing mechanism, as would occur when there was a fairly large puncture in the tire, the low pressure signaling mechanisms 11, as shown in FIGURES 4 and 5 would be actuated, giving rise to an audio or visual warning to the driver. The means by which the mechanism 11 is actuated is as follows: When the force, due to the pressure of the air in the chamber 9, acting on the signalling mechanism piston 31 is equal to or greater than that of the spring 34 the contact rod 38 is in lifted position, as in FIGURE 4 and thus does not close the circuit. A substantial decrease of the pressure in the high pressure chamber 9 results however, in a decrease of the force acting on the signalling mechanism piston 31, and thus a decrease of the forces acting downwardly on the spring 34. The piston 31 and rod 35 and contact rod 38 are forced down, as appears in FIGURE 5.

When the contact rod 38 touches a subjacent, metal contact plate 61 located on an adjacent, stationary portion of the brake assembly 62 and insulated by non-conducting insert 63, it in effect acts like a switch closing a circuit, with the current being carried from the body contact plate 61 by a suitable wire 64 to a suitable warning device, such as a light bulb, or buzzer (not shown) mounted on the dashboard. The circuit is completed by another wire (not shown) connecting this light bulb or buzzer to the vehicle's battery. The driver being thereby warned, is able to take the necessary steps to rectify the situation.

Figure 6:
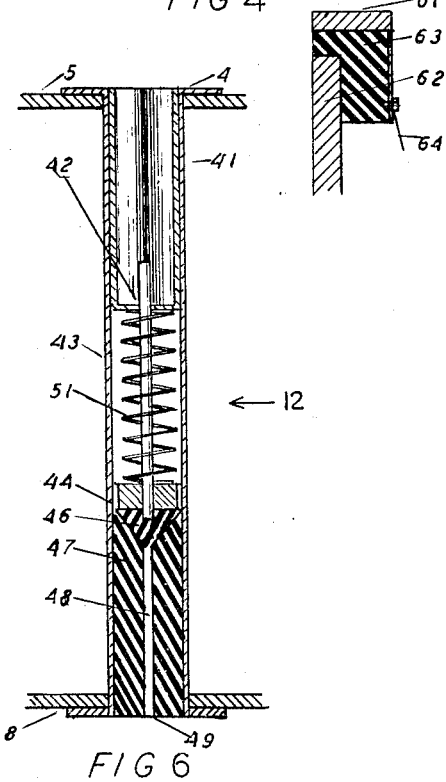
FIGURE 6 is a fragmentary sectional view to an enlarged scale of the high pressure escape valve.
Figure 7:
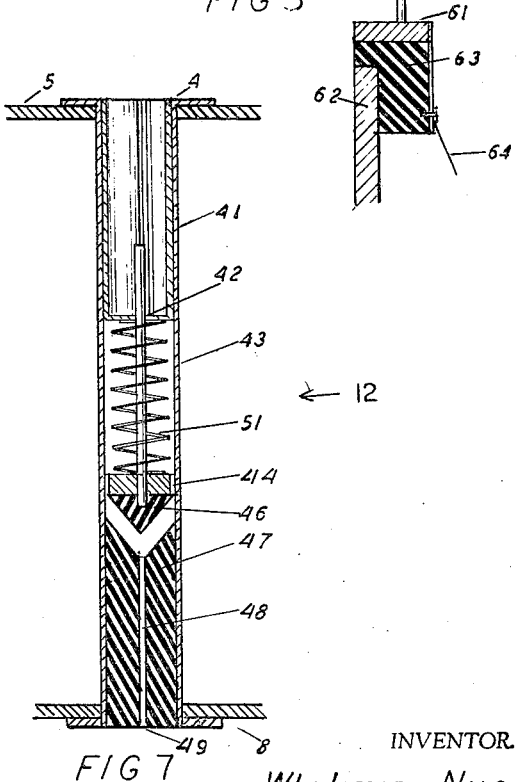
FIGURE 7 is a view similar to FIGURE 6 but with parts in a different position.

Means are also provided for reducing excessive tire pressure such means comprising the mechanism designated by the reference numeral 12 and shown in FIGURES 6 and 7. With tire pressure greater than than calibrated for the valve spring 51, the pressure in the passageway 49 unseats the valve 46 and air bleeds upwardly around the margins of the loosely fitting valve cap 44, thence through the opening in the annulus 42 and thence to the atmosphere. When the force of the spring 51 acting on the valve 46 is greater than that of the opposing air pressure the plunger is forced down into seated position as in FIGURE 6.

What is claimed is:
1. A tire safety device comprising:
   (a) a tire receiving rim plate mounted around the inner rim of a vehicle wheel;
   (b) boundary walls joining said rim plate and said inner rim and forming therewith an air tight compartment between the tire and the inner rim;
   (c) means for introducing air under high pressure into said compartment;
   (d) a pressure balancing mechanism within said hollow compartment comprised of:
       (1) a hollow tube of which one end penetrates into the tire chamber and the other end into a large cylindrical casing disposed in said compartment,
       (2) a large piston reciprocatingly mounted in said large casing, said large piston having a surface upon which the force that results from the pressure of the air within the tire acts,
       (3) a small cylindrical casing affixed to said large casing,
       (4) a small piston movable in said small casing and having a surface exposed to the pressure in said compartment, said small piston within said small cylindrical housing being V-shaped and functions both as a piston and as a valve,
       (5) a rod connecting said large piston and said small piston, and
       (6) a spring opposing the forces on said large piston and said small piston, said spring being effective to move said small piston and to connect said compartment to said tire as pressure within said tire falls below a predetermined amount, said spring being calibrated by means of an adjusting screw to provide a force upon said large piston that is equal to the force exerted by the sum of the forces acting upon said large and said small pistons when the pressure in the tire is at its specified value; and
   (e) a high pressure relief valve consisting of:
       (1) a hollow tube that penetrates completely through said compartment, providing a means of communication between the interior of the tire and the atmosphere, said hollow tube acting as a casing,
       (2) a body of solid rubber disposed within said tube in the end nearest the interior of the tire, said body having a bore running longitudinally therethrough and flaring out to form a conical seat at the aperture,
       (3) a conical plunger arranged to fit in said conical seat, thus forming a valve,
       (4) a valve rod connected to said plunger, said rod extending up the length of said tube,
       (5) a plate mounted in said tube having a central opening to receive and guide said rod, and
       (6) a spring interposed between said plate and said plunger, said spring being calibrated to provide a force on said plunger that is equal to the force produced on the plunger by the desired pressure within the tire.
2. A tire safety device comprising:
   (a) a tire receiving rim plate mounted around the inner rim of a vehicle wheel;
   (b) boundary walls joining said rim plate and said inner rim and forming therewith an air tight compartment between the tire and the inner rim;
   (c) means for introducing air under high pressure into said compartment; and
   (d) a low pressure signalling mechanism within said compartment consisting of:
       (1) a hollow cylindrical casing,
       (2) a piston at one end of said casing, one end of said piston being curved, the other end of said piston being flat,
       (3) a piston rod connected to said other end of said piston, said piston rod extending the length of said casing,
       (4) a housing supporting said casing and defining
       (5) a pivot block in said housing,
       a chamber into which said piston rod extends,
       (6) a connecting rod pivotally affixed to said pivot block and having one end pivotally connected to said piston rod, (7) a contact rod pivotally connected to the other end of said connecting rod and extending out of said housing, (8) a spring between said piston and said housing, and (9) a contact point on a non-rotating portion of the wheel, said contact rod touching said contact point only when the force exerted by said spring exceeds the force resulting from air pressure acting on said one end of said piston.

3. A tire safety device comprising:
(a) a hollow cylindrical casing secured to the rim of a vehicle wheel adjacent a vehicle tire mounted thereon;
(b) a piston reciprocably mounted on said casing with one end subjected to the air pressure carried by the tire;
(c) means for biasing said piston against said air pressure with a predetermined force;
(d) an electrical contact member mounted on a non-rotating portion of the vehicle in close juxtaposition to said casing;
(e) means connected to said piston for touching said contact member when said predetermined force of said biasing means exceeds the force exerted by said air pressure against said one end of said piston, said contact touching means comprising a housing secured to said casing, a piston rod connected to said piston and reciprocable therewith, a contact rod translatably mounted on said housing for movement toward and away from said electrical contact member, and a lever centrally fulcrumed on said housing and pivotally connected at one end to said piston rod and at the other end to said contact rod, said lever being effective to urge said contact rod toward said electrical contact member as said piston moves in a direction toward said one end thereof; and (f) electrical means connected to said contact member for signalling the driver of the vehicle when said touching means touches said contact.

4. A tire safety device as in claim 3 wherein said biasing means is a compression spring arranged for urgency against the other end of said piston.

5. A tire safety device as in claim 4 wherein said electrical means includes electrical conductors connected to the vehicle electrical system and to a warning device.

References Cited

UNITED STATES PATENTS

| 2,071,256 | 2/1937 | Dobbs | 152—415 |
|---|---|---|---|
| 2,239,676 | 4/1941 | Henry | 152—415 |
| 2,316,461 | 4/1943 | Schubert | 152—415 |
| 2,362,883 | 11/1944 | Cecil | 152—415 |
| 2,523,594 | 9/1950 | Sagaser et al. | 152—415 |
| 2,592,181 | 4/1952 | Parthemore | 152—415 |
| 2,344,362 | 3/1944 | McNulty | 152—418 |
| 2,931,385 | 4/1960 | Carlisle et al. | 137—540 |
| 2,939,504 | 6/1960 | Bedford | 152—418 |
| 3,056,424 | 10/1962 | Courtot et al. | 137—505.47 |

ARTHUR LA POINT, Primary Examiner

C. B. LYON, Assistant Examiner

U.S. Cl. X.R.

137—505